United States Patent Office 3,446,813
Patented May 27, 1969

3,446,813
CERTAIN 3-HYDROXY 1,2,5-THIADIAZOLES AND A PROCESS FOR PREPARING THEM
Melvin Perelman, Gayton, England, Reuben G. Jones, Indianapolis, Ind., and Stephen A. Mizsak, Monroeville, Pa., assignors to Eli Lilly and Company, Indianapolis, Ind., a corporation of Indiana
No Drawing. Continuation-in-part of application Ser. No. 408,377, Nov. 2, 1964. This application Dec. 7, 1966, Ser. No. 599,707
Int. Cl. C07d 91/68; A61k 27/00
U.S. Cl. 260—302    7 Claims

ABSTRACT OF THE DISCLOSURE

The present invention concerns certain novel 3-hydroxy-4-substituted-1,2,5-thiadiazoles in which the substituent in the 4-position is a group such as branched-chain alkyl, cycloalkyl, β-alkylmercaptoethyl, vinyl, phenyl, substituted phenyl, benzyl, and substituted benzyl. The invention further concerns a novel process for the preparation of compounds of the disclosed type by the reaction of an α-amino amide or an acid addition salt thereof with thionyl chloride or thionyl aniline. By virtue of their ability to suppress the growth of bacteria and fungi, the compounds provided are useful ingredients of disinfectant solutions.

The present application is a continuation-in-part of our copending application Ser. No. 408,377, filed Nov. 2, 1964 (now abandoned).

This invention relates to novel heterocyclic compounds and to a process for the preparation thereof. More particularly this invention relates to the preparation of novel hydroxythiadiazoles from amides of α-amino acids.

The heterocyclic compounds provided by this invention are systematically named as 3-hydroxy-4-substituted-1,2,5-thiadiazoles and have the following structural formula:

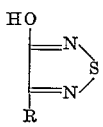

wherein R represents branched-chain alkyl having from 3 to 8 carbon atoms; cycloalkyl having from 5 to 8 ring carbon atoms; β-lower alkylmercaptoethyl wherein the alkylmercapto group contains from 1 to 4 carbon atoms; vinyl; phenyl; substituted phenyl; benzyl; and substituted benzyl.

When R in the above formula represents substituted phenyl, it can be for example, o-, m-, or p-tolyl, xylyl, o-, m-, or p-chlorophenyl, 3,4-dichlorophenyl, o-bromophenyl, o-iodophenyl, o-fluorophenyl, m-trifluoromethylphenyl, o-, m-, or p-nitrophenyl, p-anisyl, and the like. Substituted benzyl radicals which can be represented by R in the general formula include 2-methylbenzyl, 3-methylbenzyl, 4-methylbenzyl, 2-chlorobenzyl, 4-chlorobenzyl, 3,4-dichlorobenzyl, 2-bromobenzyl, 2-fluorobenzyl, 3-trifluoromethylbenzyl, 2-nitrobenzyl, 4-nitrobenzyl, 4-methoxybenzyl, 2,4-dimethylbenzyl, 2-chloro-4-methylbenzyl, and the like. Illustrative of the branched-chain alkyl groups represented by R are isopropyl, isobutyl, 2,2-dimethylpropyl, 2-methylbutyl, isoamyl, 2-methylpentyl, 3-methylpentyl, 3,3-dimethylpentyl, 2,3-dimethylpentyl, 2-ethylpentyl, 2-methylhexyl, 3-methylhexyl, 2,4-dimethylhexyl, 3,5-dimethylhexyl, 3-ethylhexyl, 2-methylheptyl and the like. Representative of the cycloalkyl groups which can be employed are cyclopentyl, cycloheptyl, cyclohexyl, and cyclo-octyl as well as the lower alkyl substituted counterparts thereof, such as, for example, methylcyclopentyl, methylcyclohexyl, and the like.

Although the 1,2,5-thiadiazole ring system is well known, it has not heretofore been possible to prepare 3-hydroxy-1,2,5-thiadiazoles having, in the 4-position, substituents of the type present in the compounds of the present invention by a practical method. The present invention, therefore, not only makes available for the first time compounds of this nature but also provides a process suitable for the preparation of such compounds.

The 3-hydroxy-4-substituted-1,2,5-thiadiazoles of this invention can be prepared by reacting an appropriate α-aminocarboxamide, in a suitable solvent or dispersant, with thionyl chloride or thionyl aniline. The α-amino amides can be employed either as the free bases or as the corresponding acid addition salts thereof. In general, when thionyl aniline is employed for ring closure, it is preferred to use the α-amino amides in the free base form. When thionyl chloride is employed, the hydrogen chloride liberated in the reaction immediately forms a hydrochloride salt with any free amino groups, so that it matters little whether the α-amino amide is initially present as the free base or as a salt thereof. The solvent or dispersant employed as a reaction medium can be any one of a number of inert solvents, chloroform and pyridine being especially preferred. For the purposes of the present disclosure, an inert solvent or dispersant is simply one which does undergo a substantial change in the presence of the reactants under the reaction conditions employed. In general, chloroform is a preferred reaction medium when thionyl chloride is employed for ring closure, whereas pyridine is preferrd when the ring closure is effected by the use of thionyl aniline.

The conditions under which the reaction is carried out can be varied extensively, and are generally such that the entire reaction can be carried out without the necessity of employing specialized equipment. The process can be carried out at any temperature which is high enough to initiate the reaction and below the decomposition point of the reaction components. In general, it is preferred to carry out the reaction at a temperature between about 60° C. and about 120° C. An especially preferred method of preparation, when chloroform is employed as the solvent medium, comprises mixing together in chloroform equimolar quantities of the reactants, heating the reaction mixture to reflux temperature, and maintaining this temperature for a period of from about 1 to about 16 hours or longer. When pyridine is employed as the reaction medium, the mixture is generally heated with stirring to a temperature between about 90° C. and 100° C. for a similar time. Isolation of the reaction product is effected by taking advantage of the acidic nature of the 3-hydroxy substituent, which permits the extraction of the final product from the reaction mixture with aqueous sodium hydroxide or a similar aqueous base.

When the α-amino amide employed as a starting material in the process of the present invention is an α-aminobutyramide which is further substituted in the γ-position by a group which readily undergoes elimination under the conditions of the reaction, 3-hydroxy-4-vinyl-1,2,5-thiadiazole is produced. One such amide which serves admirably for the preparation of the vinyl-substituted thiadiazole is (3 - amino-3-carbamylpropyl)dimethylsulfonium chloride.

The α-amino amides employed as starting materials in this invention are readily prepared according to methods well known in the art by esterification of the corresponding α-amino acids followed by ammonolysis of the resulting α-amino esters. The intermediate α-amino acids, if not commercially available, can be prepared by any of a number of standard procedures, such as, for example the Strecker synthesis, amination of α-halo acids, and the like.

The 3-hydroxy-4-substituted-1,2,5-thiadiazoles provided by this invention are useful in suppressing the growth of a variety of bacteria and fungi. They can, therefore, be employed as the active ingredients in disinfectant solutions.

The examples which follow are illustrative of the practice of the invention but are not to be construed as limiting the scope thereof.

EXAMPLE 1

A suspension of 10 g. of 2-amino-3-methylbutyramide hydrochloride in 200 ml. of chloroform is treated with stirring with 150 ml. of thionyl chloride. The resulting solution is maintained under gentle reflux with stirring for about 48 hours. The dark brown-red reaction mixture is concentrated to dryness in vacuo, and the residual brown solid is dissolved in a mixture of chloroform and water. The water layer is washed thoroughly with chloroform and discarded. The combined chloroform phases are extracted twice with 10 percent aqueous sodium hydroxide solution, the basic extracts are cooled in an ice bath, and concentrated hydrochloric acid is added cautiously until the mixture is acidic. The reaction product is extracted from the acidic mixture with chloroform, and the chloroform extracts are washed with brine. After drying over anhydrous magnesium sulfate, the chloroform is removed in vacuo to give a residue comprising 3-hydroxy-4-isopropyl-1,2,5-thiadiazole. A sample purified by sublimation at about 50° C. at about 0.3 mm. melts at about 84–85° C.

When 2-aminophenylacetamide is employed in the above-described procedure 3-hydroxy-4-phenyl-1,2,5-thiadiazole is obtained. Sublimation at about 100° C. at about 0.3 mm. gives material melting at about 165–166° C.

By employing the same procedure with appropriately substituted α-aminoacetamide hydrochlorides the following substituted 1,2,5-thiadiazoles can also be obtained:

3-hydroxy-4-isobutyl-1,2,5-thiadiazole from 2-amino-5-methylcaproamide hydrochloride.

3-hydroxy-4-(2'-methylpenyl)-1,2,5-thiadiazole from 2-amino-5-methylcaprylamide hydrochloride.

3-hydroxy-4-(3'-methylpentyl)-1,2,5-thiadiazole from 2-amino-6-methylcaprylamide hydrochloride.

3-hydroxy-4-(2',2'-dimethylpropyl)-1,2,5-thiadiazole from 5,5-dimethylcaproamide hydrochloride.

3-hydroxy-4-(o-tolyl)-1,2,5-thiadiazole from 2-amino-2-(o-tolyl)acetamide hydrochloride.

3-hydroxy-4-(m-tolyl)-1,2,5-thiadiazole from 2-amino-2-(m-tolyl)acetamide hydrochloride.

3-hydroxy-4-(p-tolyl)-1,2,5-thiadiazole from 2-amino-2-(p-tolyl)acetamide hydrochloride.

3-hydroxy-4-(m-xylyl)-1,2,5-thiadiazole from 2-amino-2-(m-xylyl)acetamide.

3-hydroxy-4-(o-chlorophenyl)-1,2,5-thiadiazole from 2-amino-2-(o-chlorophenyl)acetamide.

3-hydroxy-4-(m-chlorophenyl)-1,2,5-thiadiazole from 2-amino-2-(m-chlorophenyl)acetamide.

3-hydroxy-4-(p-chlorophenyl)-1,2,5-thiadiazole from 2-amino-2-(p-chlorophenyl)acetamide.

3-hydroxy-4-(o-bromophenyl)-1,2,5-thiadiazole from 2-amino-2-(o-bromophenyl)acetamide.

3-hydroxy-4-(o-fluorophenyl)-1,2,5-thiadiazole from 2-amino-2-(o-fluorophenyl)acetamide.

3-hydroxy-4-(3,4-dichlorophenyl)-1,2,5-thiadiazole from 2-amino-2-(3,4-dichlorophenyl)acetamide.

3-hydroxy-4-(m-trifluoromethylphenyl)-1,2,5-thiadiazole from 2-amino-2-(m-trifluoromethylphenyl)acetamide.

3-hydroxy-4-(o-nitrophenyl)-1,2,5-thiadiazole from 2-amino-2-(o-nitrophenyl)acetamide.

3-hydroxy-4-(m-nitrophenyl)-1,2,5-thiadiazole from 2-amino-2-(m-nitrophenyl)acetamide.

3-hydroxy-4-(p-nitrophenyl)-1,2,5-thiadiazole from 2-amino-2-(p-nitrophenyl)acetamide.

3-hydroxy-4-(p-anisyl)-1,2,5-thiadiazole from 2-amino-2-(p-methoxyphenyl)acetamide.

3-hydroxy-4-benzyl-1,2,5-thiadiazole, from β-phenylalanine.

3-hydroxy-4-(p-chlorobenzyl)-1,2,5-thiadiazole, from β-(p-chlorophenyl)alanine.

3-hydroxy-4-(o-chlorobenzyl)1,2,5-thiadiazole, from β-(o-chlorophenyl)alanine.

3-hydroxy-4-(3,4-dichlorobenzyl)-1,2,5-thiadiazole, from β-(3,4-dichlorophenyl)alanine.

3-hydroxy-4-(p-bromobenzyl)-1,2,5-thiadiazole, from β-(p-bromophenyl)alanine.

3-hydroxy-4-(p-methylbenzyl)-1,2,5-thiadiazole, from β-(p-tolyl)alanine.

3-hydroxy-4-(p-nitrobenzyl)-1,2,5-thiadiazole, from β-(p-nitrophenyl)alanine.

EXAMPLE 2

To a suspension of 22 g. of 2-amino-3-methylbutyramide in about 1500 ml. of dry pyridine are added with stirring 121 g. of thionyl aniline. The reaction mixture is warmed to about 90° C. and is maintained at a temperature between about 90–100° C. for about 16 hours. The reaction mixture is maintained under a nitrogen atmosphere during the addition and throughout the heating period. After the pyridine is removed in vacuo, the residual oil is dissolved in chloroform and the chloroform solution is extracted thoroughly with 10 percent aqueous sodium hydroxide solution. The combined basic extracts are cooled and acidified with concentrated hydrochloric acid, and the product is extracted into chloroform. The chloroform extract is washed with brine, dried over anhydrous magnesium sulfate, and filtered to remove the drying agent. The residual solid is purified by chromatography over a column packed with a mixture of silicic acid and Super Cel (a commercial filter aid sold by the Johns-Manville Corporation) and eluted with benzene. The fractions containing the desired product are pooled and the benzene is evaporated to give 3-hydroxy-4-isopropyl-1,2,5-thiadiazole identical to that obtained by the procedure of Example 1.

EXAMPLE 3

A solution of 6.46 g. of methioninamide in 500 ml. of pyridine is treated with 12 g. of thionyl aniline. A nitrogen atmosphere is maintained during the addition and throughout the reaction period. The reaction mixture is stirred at room temperature for two hours and is then gradually warmed to about 90° C. and held at this temperature overnight. Concentration of the reaction mixture in vacuo yields a dark oil which is then dissolved in chloroform. The product is extracted from the chloroform solution with 10 percent aqueous sodium hydroxide solution, the combined basic extracts are cooled and acidified with concentrated hydrochloric acid, and the acidified mixture is extracted with chloroform. After being washed with brine and dried over anhydrous magnesium sulfate, the chloroform solution is evaporated in vacuo to give a dark-brown solid residue. Recrystallization of the solid material from Skelly B yields 3-hydroxy-4-(β-methylmercaptoethyl)-1,2,5-thiadiazole, melting at about 65° C.

By employing in the above procedure analogs of methioninamide in which the methylmercapto group is replaced by other alkylmercapto groups, such as for example, ethylmercapto, propylmercapto and butylmercapto, the corresponding 3-hydroxy-4-(β-alkyl mercaptoethyl)-1,2,5-thiadiazoles are obtained.

EXAMPLE 4

A suspension of 500 g. of methionine in 4 liters of methanol is cooled and saturated with anhydrous hydrogen chloride. The reaction mixture is kept in a stoppered flask overnight at room temperature and is then evaporated to dryness under vacuum. The residue is dissolved in about 4 liters of methanol and saturated with gaseous ammonia at 0° C. The saturated solution is kept in a stoppered flask at room temperature for two days and is then evaporated under vacuum. The residue is crystallized from absolute ethanol to give (3-amino-3-carbamoylpropyl)dimethylsulfonium chloride hydrochloride melting at about 168–172° C.

A suspension of 10 g. of (3-amino-3-carbamoylpropyl)-dimethylsulfonium chloride hydrochloride in 200 ml. of chloroform is treated with 100 ml. of thionyl chloride. The reaction mixture is stirred at room temperature for an hour, and is then heated under reflux for about 48 hours. Concentration of the reaction mixture in vacuo yields a brown solid residue which is suspended in chloroform. The chloroform solution is extracted with 10 percent aqueous sodium hydroxide solution and the combined basic extracts are acidified with concentrated hydrochloric acid. The acidified mixture is extracted with chloroform and the chloroform solution is dried over anhydrous magnesium sulfate, filtered, and evaporated in vacuo to give a light pink residue of 3-hydroxy-4-vinyl-1,2,5- thiadiazole melting at about 92–94° C.

We claim:
1. A compound of the formula

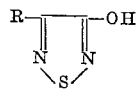

wherein R is selected from the group consisting of $C_3$–$C_8$ branched-chain alkyl; cycloalkyl having from 5 to 8 ring carbon atoms; β-lower alkylmercaptoethyl, wherein the alkylmercapto group contains from 1 to 4 carbon atoms; vinyl; phenyl; substituted phenyl having at least one radical of the group consisting of methyl, halo, trifluoromethyl, nitro, and methoxy; benzyl; and benzyl having at least one substituent selected from the group consisting of methyl, halo, trifluoromethyl, nitro, and methoxy.

2. A compound according to claim 1, said compound being 3-hydroxy-4-isopropyl-1,2,5-thiadiazole.

3. A compound according to claim 1, said compound being 3-hydroxy-4-phenyl-1,2,5-thiadiazole.

4. A compound according to claim 1, said compound being 3-hydroxy-4-vinyl-1,2,5-thiadiazole.

5. A compound according to claim 1, said compound being 3-hydroxy-4-(β-methylmercaptoethyl)-1,2,5-thiadiazole.

6. The process of preparing a compound of the formula

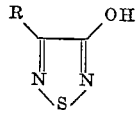

wherein R is selected from the group consisting of $C_1$–$C_8$ alkyl; cycloalkyl having from 5 to 8 ring carbon atoms; β-lower alkylmercaptoethyl wherein the alkylmercapto group contains from 1 to 4 carbon atoms; phenyl; substituted phenyl, having at least one radical of the group consisting of methyl, halo, trifluoromethyl, nitro, and methoxy; benzyl; and benzyl having at least one substituent selected from the group consisting of methyl, halo, trifluoromethyl, nitro, and methoxy, which comprises commingling, in an inert reaction medium, a compound selected from the group consisting of compounds of the formula

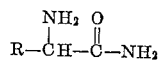

and the acid addition salts thereof with a compound selected from the group consisting of thionyl chloride and thionyl aniline at a temperature sufficient to initiate reaction.

7. The process for preparing a compound of the formula

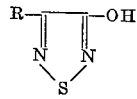

wherein R is selected from the group consisting of lower alkyl and phenyl, which comprises reacting, in an inert reaction medium, a compound of the formula

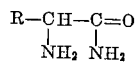

with thionyl chloride at a temperature sufficient to initiate reaction and thereafter hydrolyzing the reaction product.

References Cited

UNITED STATES PATENTS 3,391,150   7/1968   Woinstock _____ 260—302

NICHOLAS S. RIZZO, *Primary Examiner.*

U.S. Cl. X.R.

260—306.7, 999